US006434465B2

(12) United States Patent
Schmitt et al.

(10) Patent No.: US 6,434,465 B2
(45) Date of Patent: Aug. 13, 2002

(54) METHOD FOR CONTROLLING/ REGULATING A PROCESS IN A MOTOR VEHICLE AND DEVICE FOR IMPLEMENTING THE METHOD

(75) Inventors: Manfred Schmitt, Heppenheim; Werner Hess, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 09/751,062

(22) Filed: Dec. 28, 2000

(30) Foreign Application Priority Data

Dec. 28, 1999 (DE) .......................... 199 63 213

(51) Int. Cl.[7] .............................................. B60K 41/08
(52) U.S. Cl. ................ 701/53; 701/54; 701/55
(58) Field of Search .......................... 701/53, 54, 55, 701/56, 58, 59, 102

(56) References Cited

U.S. PATENT DOCUMENTS 4,829,440 A * 5/1989 Abe ........................... 701/109
5,063,510 A * 11/1991 Jügens et al. ................. 701/58

FOREIGN PATENT DOCUMENTS

DE           34 38 781           4/1986

* cited by examiner

Primary Examiner—William A. Cuchlinski, Jr.
Assistant Examiner—Marthe Marc-Coleman
(74) Attorney, Agent, or Firm—Kenyon & Kenyon

(57) ABSTRACT

A method for controlling/regulating a process in a motor vehicle, in particular a combustion process, gear-shifting process, or braking process, with the help of a characteristics grid map, which is defined by a plurality of performance quantities of the process and represented by data points that have corresponding characteristics-map values. At least one characteristics-map value is determined from the characteristics grid map in a control cycle for an operating point by first determining adjacent data points, which define an interpolation range in which the operating point lies, and by then interpolating between the adjacent data points. To reduce the computational time for interpolation, the at least one characteristics-map value is determined for the operating range within the framework of a linear interpolation based on a minimum number of data points. The minimum number of data points results from a number of the plurality of performance quantities of the process, which define the characteristics map, plus one.

11 Claims, 2 Drawing Sheets

METHOD FOR CONTROLLING/REGULATING A PROCESS IN A MOTOR VEHICLE AND DEVICE FOR IMPLEMENTING THE METHOD

FIELD OF THE INVENTION

The present invention relates to a method for controlling/regulating a process in a motor vehicle, in particular a combustion process, gear-shifting process, or braking process, with the help of a characteristics grid map. The characteristics map is defined by several performance quantities of the process, which is to be controlled or regulated, and is represented by data points that have corresponding characteristics-map values. The control/regulation of the process occurs in consecutive control cycles. In one control cycle, at least one characteristics-map value is determined from the characteristics map for an operating point of the process. In addition, adjacent data points, which define an interpolation range in which the operating point lies, are initially determined, and then interpolation is performed between the data points. The present invention also relates to a control/regulating device for implementing this method.

BACKGROUND INFORMATION

A central problem in realizing control systems or regulating systems, in particular in automotive engineering, is simulating characteristics of the subsystems, which are to be controlled or regulated, in a computing device of the control/regulating device. For example, from these internal simulations, important internal state variables, which cannot be directly measured online or are not measured for cost reasons, can be determined for a controller, or the values determined by the simulation are used for the direct control or regulation of a process.

For representing a model in a control/regulating device, there are two fundamentally different conventional approaches:

simulating the relevant physical-technical system characteristics using a mathematical model (for example a differential equation system); and
 directly storing pertinent system data as a function of the relevant performance quantities (characteristics map).

For use in a motor vehicle, a characteristics map has the advantage of a low computing time requirement, since complicated model calculations are not necessary. Instead, the values corresponding to a specific operating point of a process can be taken directly from the characteristics map. The characteristics map also has advantages in regards to simplifying the application. In a model representation that has analytical equations that describe physical contexts, the applications engineer generally must have extensive knowledge of the model structure to be able to perform a targeted optimization. Since the influence of the parameters, which are to be adapted, usually extends to additional areas of the "address space" and a more or less strong coupling of the influences exists, a lengthy, iterative search for the optimum parameter combination may be necessary in some instances. By contrast, every data point adjustment in a characteristics-map representation has a clearly defined, strictly limited local effect. Therefore, detailed model knowledge or an iterative procedure are not necessary. A systematic, standardizable adjustment is possible and can even be automated in some instances.

For these reasons, using characteristics maps for controlling or regulating processes in mass-produced control/regulating devices is already widespread today. In motor vehicles, characteristics maps are used, for instance, for injection and ignition, and for precisely managing additional modern engine management system tasks. Characteristics maps are also widely used for providing complex model information in safety systems such as anti-lock braking systems (ABS), anti-spin regulation (ASR), and other systems, which ensure driving stability and/or safety, and/or influence braking action, as well as in numerous other applications such as automated transmissions.

The characteristics maps used can be one-dimensional (characteristic curves) or two or more-dimensional. Since the demands for functionality and precision in the processes, which are to be controlled or regulated, are constantly rising, it will be increasingly necessary in the future to link more than two performance quantities in a characteristics map. Moreover, an exact coordination of performance quantities, which influence one another, such as injection quantity, ignition-advance angle, acceleration enrichment, etc. will be necessary.

The characteristics map of the present method for controlling/regulating a process in a motor vehicle is designed as a characteristics grid map. The data points, which represent a characteristics grid map, are usually arrayed equidistant to each other. However, there are conventional characteristics grid maps, in which the data points are placed in the ranges of the input variables, in which ranges the function to be stored changes dramatically. To this end, the input variable is non-linearly mapped on the characteristics map using a data-point table having non-equidistant data-point distribution. Equidistant data-point distribution can then be expected again within the characteristics map.

German Patent No. 34 38 781 describes a method using a characteristics grid map to help control/regulate a process in a motor vehicle. However, the method described therein is limited to a two-dimensional characteristics grid map, i.e. to a characteristics grid map that is defined by two performance quantities of the process. German Patent No. 34 38 781 describes a square interpolation (bilinear interpolation) in FIG. 3 and the corresponding figure description, and a triangular interpolation in FIG. 4 and the corresponding figure description.

Within the framework of a square interpolation, four adjacent data points are first determined that define an interpolation square in which an operating point of the process to be controlled or regulated lies. Subsequently, bilinear interpolation is performed between the data points. In triangular interpolation, three adjacent data points are first determined that define an interpolation triangle in which the operating point of the process lies. Subsequently, interpolation is performed between the data points within the bounds of non-linear interpolation. The described square interpolation has the disadvantages that a relatively large program size must be made available and that producing the characteristics-map value corresponding to the operating point necessitates a relatively long running time. In contrast, the described triangular interpolation has the advantage of a smaller program size with respect to the square interpolation, and the disadvantage of a longer running time. Yet above all, program size (a cost factor) and the processing speed of a processing unit play a major role in the application of a conventional method for controlling/regulating a process in a motor vehicle. Furthermore, the described triangular interpolation is limited to use in a characteristics grid map that has equidistant data-point distribution at a distance of the power of two.

SUMMARY OF THE INVENTION

An object of the present invention is to provide a method and device for controlling/regulating a process in a motor vehicle that are universally employable for characteristics maps of any dimension and data-point distribution, that have a reduced computational time for interpolation for constant or not significantly worsening interpolation quality, and that have an interpolated characteristics-map surface that has a steady pattern without discontinuities.

The object of the present invention is achieved by a method and device for controlling/regulating a process in a motor vehicle that determines the characteristics-map value for the operating point within the framework of a linear interpolation from a minimum number of data points. The number of data points resulting from the number of performance quantities of the process, which define the characteristics map, plus one.

The linear interpolation can be performed using, for example, an interpolation approach involving barycentric coordinates. Barycentric coordinates are coordinates related to the interpolation range that determine corresponding weighting values for the characteristics-map values corresponding to the data points as a function of the position of the operating point between the data points.

Linear interpolation has the advantage that for every additional dimension of the characteristics map, i.e. for every additional performance quantity of the process, by which the characteristics map is defined, only one additional data point is necessary. By contrast, in the bilinear interpolation used in conventional methods, the number of data points for each additional dimension of the characteristics map increases exponentially.

Thus, in the method according to the present invention, the computational time for interpolation is significantly reduced by linearly interpolating a minimum number of data points, which result from the dimension of the characteristics map plus one, without diminishing the interpolation quality. Moreover, the interpolated characteristics-map surface has a steady pattern and no discontinuities. Finally, the method according to the present invention is universally applicable independent of the characteristics-map dimension.

According to an advantageous embodiment of the present invention, it is proposed that the characteristics grid map be defined by two performance quantities of the process, and in the control cycle for the operating point of the process. At least one characteristics-map value is determined from the characteristics map by first determining three adjacent data points, which define an interpolation triangle in which the operating point lies, and by then interpolating between the data points using the interpolation equation:

$$Y_W = (B_1 * Y_1 + B_2 * Y_2 + B_3 * Y_3)/(B_1 + B_2 + B_3),$$

wherein $B_1$, $B_2$, $B_3$ are the areas of triangular sections, which are defined by the operating point and each of two data points, within the interpolation triangle, which is defined by specific data points.

Advantageously, the three adjacent data points, which define the interpolation triangle in which the operating point lies, are determined by first establishing the grid square of the characteristics map in which the operating point lies by searching a data-point table. Then, the interpolation triangle in which the operating point lies is determined within the established grid square by comparing the performance-quantity components of the operating point.

According to another advantageous embodiment of the present invention, the characteristics grid map be defined by three performance quantities of the process. The at least one characteristics-map value is determined from the characteristics map in the control cycle for the operating point of the process by initially determining four adjacent data points, which define an interpolation tetrahedron in which the operating point lies and by then interpolating between the data points using the interpolation equation:

$$Y_W = (B_1 * Y_1 + B_2 * Y_2 + B_3 * Y_3 + B_4 * Y_4)/(B_1 + B_2 + B_3 + B_4),$$

wherein $B_1$, $B_2$, $B_3$, $B_4$ are the volumes of tetrahedral sections, which are defined by the operating point and three data points, and are within the interpolation tetrahedron, which is defined by specific data points.

The characteristics grid map for the method according to the present invention may have any dimension. The method according to the present invention is not limited to using two or three-dimensional characteristics grid maps according to the aforementioned advantageous embodiments. For every additional dimension of the characteristics map, the interpolation equation must be expanded in the numerator by the addend $B_n * Y_n$ and in the denominator by the addend $B_n$.

To further reduce the computational time for interpolation, according to an exemplary embodiment of the present invention, the distances between two adjacent data points of the characteristics grid map be normalized to the value 1 prior to interpolating. In the case of a two-dimensional characteristics grid map, the result is an area of the interpolation triangle in which the operating point lies, i.e. for the sum of the areas of the triangular sections, an area of ½=0.5. When both numerator and denominator of the interpolation equation are multiplied by 2, the result is the value 1 in the denominator. From this, the following interpolation equation results:

$$Y_W = 2 * (B_1 * Y_1 + B_2 * Y_2 + B_3 * Y_3).$$

Thus, after normalizing, an additional multiplication function must be performed for interpolation. However, one division function and two addition functions are no longer necessary.

As a result of the characteristics-map access to the data-point tables, the data points for the interpolation calculation in a two-dimensional characteristics grid map are at (0,0), (1,1) and (1,0) or (0,1). As a result, equidistant data-point distribution can be expected within the characteristics map, thereby decidedly reducing the computational time for calculating the areas of the triangular sections. Thus, the areas of the triangular sections are calculated as follows:

$$2 * B_2 = W_1 * S_{32} - W_2 * S_{31} = W_1 - W_2,$$

$$2 * B_3 = -W_1 * S_{22} + W_2 * S_{21} = W_2,$$

$$2 * B_1 = 1 - 2 * (B_2 + B_3) = 1 - 2 * W_1,$$

wherein $W_1$, $W_2$ are the coordinates of operating point W on the $X_1$-axis or $X_2$-axis. Furthermore, $S_{i1}$ and $S_{i2}$ are the coordinates of data points $S_i$ on the $X_1$-axis or $X_2$-axis of the coordinate system. The interpolation equation for a two-dimensional characteristics grid map is thereby simplified to:

$$Y_W = Y_1 + W_1 * (Y_2 - Y_1) + W_2 * (Y_3 - Y_2).$$

For characteristics-map dimensions n greater than 2, the interpolation equation is generally simplified to:

$$Y_W = Y_1 + SUM\left\{\overset{n}{\underset{i=1}{}} W_1 * (Y_{(l+1)} - Y_1)\right\}$$

The proposed simplification leads to a significant reduction in the computational time for the calculation of the areas of the triangular sections, and thus, to a simplification of the interpolation equation.

According to another advantageous embodiment of the present invention, the operating point and the calculated characteristics-map value are stored at the end of a control cycle and a check test is made at the start of the subsequent control cycle to determine if the operating point of the subsequent control cycle has remained the same. In this exemplary embodiment, the fact that the operating point typically travels through the characteristics map continuously and with a limited rate of change is taken into account. If the operating point of the subsequent control cycle is the same as the operating point of the previous control cycle, the stored characteristics-map value can be called up and used without having to interpolate. In this way, the average calculation time for interpolation can be significantly reduced. In a two-dimensional characteristics map, which is provided with such an accelerated access, only three values, namely the $X_1$ and $X_2$ coordinates of the old operating point and the corresponding interpolation result, must be stored for this purpose in a memory of the control/regulating device, for example in the RAM.

According to yet another exemplary embodiment of the present invention, intermediate values $Y_1$ and $Y_{(i+1)-Yi}$ of the interpolation equation are stored at the end of a control cycle, and a check test is made at the beginning of the subsequent control cycle to determine if the operating point of the subsequent control cycle has remained within the same interpolation range. If this is the case, the stored intermediate values can be used for calculating the interpolation range. Thus, for example in a two-dimensional characteristics map, the computational time is reduced to two multiplication functions and two addition functions.

DETAILED DESCRIPTION

Figure 1:
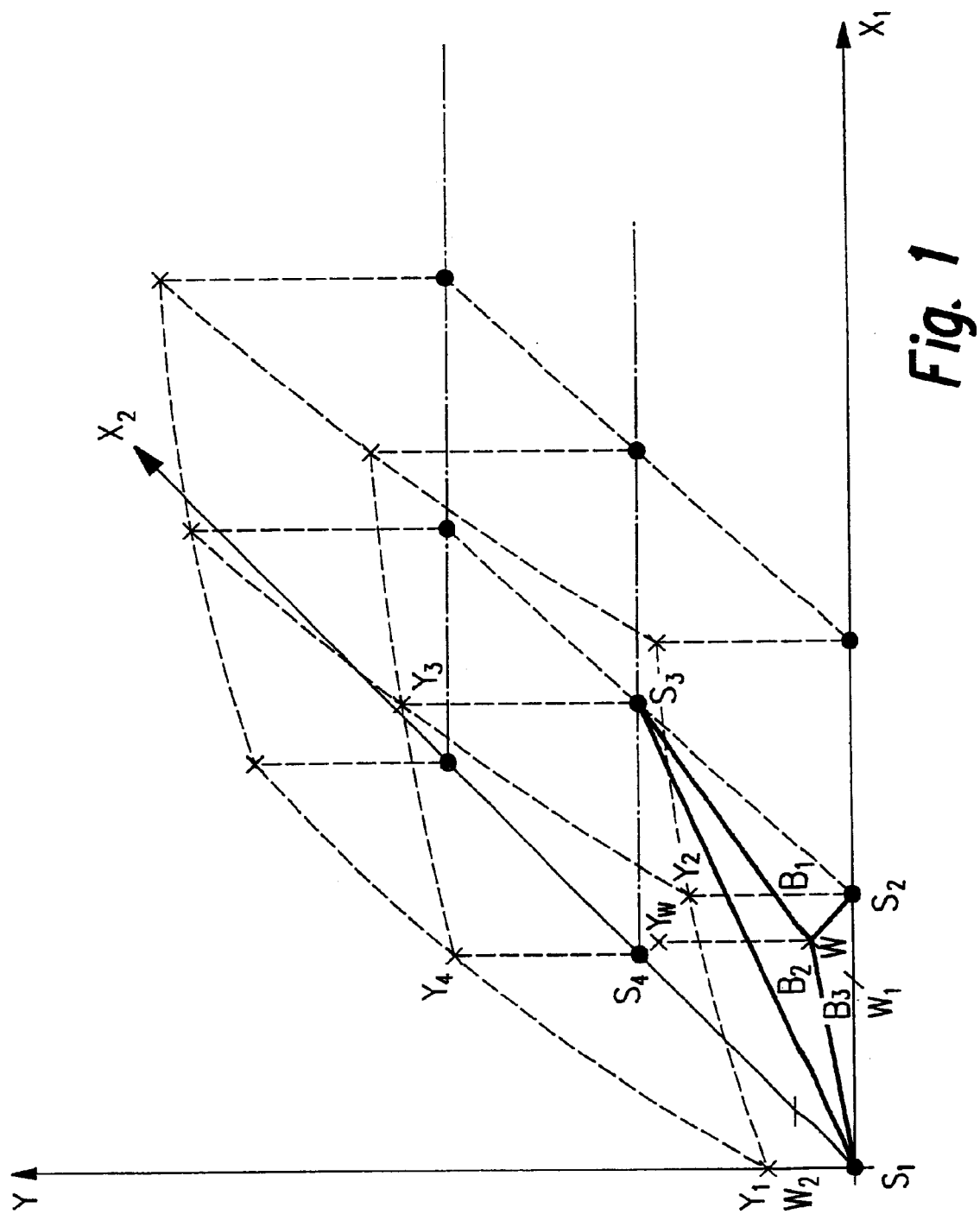
FIG. 1 shows a characteristics grid map that has equidistant data points according to one embodiment of a method according to the present invention.

In FIG. 1, a two-dimensional characteristics grid map is depicted, as it is used for controlling (open loop control)/regulating (closed loop control) a process in a motor vehicle, in particular a combustion process, gear-shifting process, or braking process. The characteristics map is defined by performance quantities $X_1$, $X_2$ of the process, which is to be controlled or regulated, and is represented by data points $S_i$ that have corresponding characteristics-map values $Y_i$. The control/regulation of the process occurs in consecutive control cycles. In one control cycle, at least one characteristics-map value $Y_W$ is determined from the characteristics map for an operating point W. For this purpose, adjacent data points $S_1$, $S_2$, $S_3$ are first determined that define an interpolation triangle in which operating point W lies. Then interpolation is performed between the data points of the interpolation triangle.

A two-dimensional characteristics grid map consists of a plurality of grid squares, each of which is bordered by four data points $S_1$, $S_2$, $S_3$, $S_4$. Each grid square can be subdivided into two triangles by using a diagonal to connect two opposite data points $S_1$, $S_3$. With uniform triangulation of all grid squares (for example, $S_1$–$S_3$ in FIG. 2), the subsequent computation steps can be made particularly simple.

The actual grid square is determined by searching the data-point tables as in a conventional access. In the actual grid square, the actual interpolation triangle is then determined by comparing performance-quantity components $W_1$, $W_2$ of operating point W. If $W_1 > W_2$, operating point W lies within triangle $S_1$, $S_2$, $S_3$, otherwise, within triangle $S_1$, $S_3$, $S_4$. If $W_1 < W_2$, $S_4$ is loaded instead of $S_2$ as the third data point (in addition to $S_1$ and $S_3$), and $W_1$ is exchanged with $W_2$ during loading. The actual interpolation calculation is identical.

Figure 2:
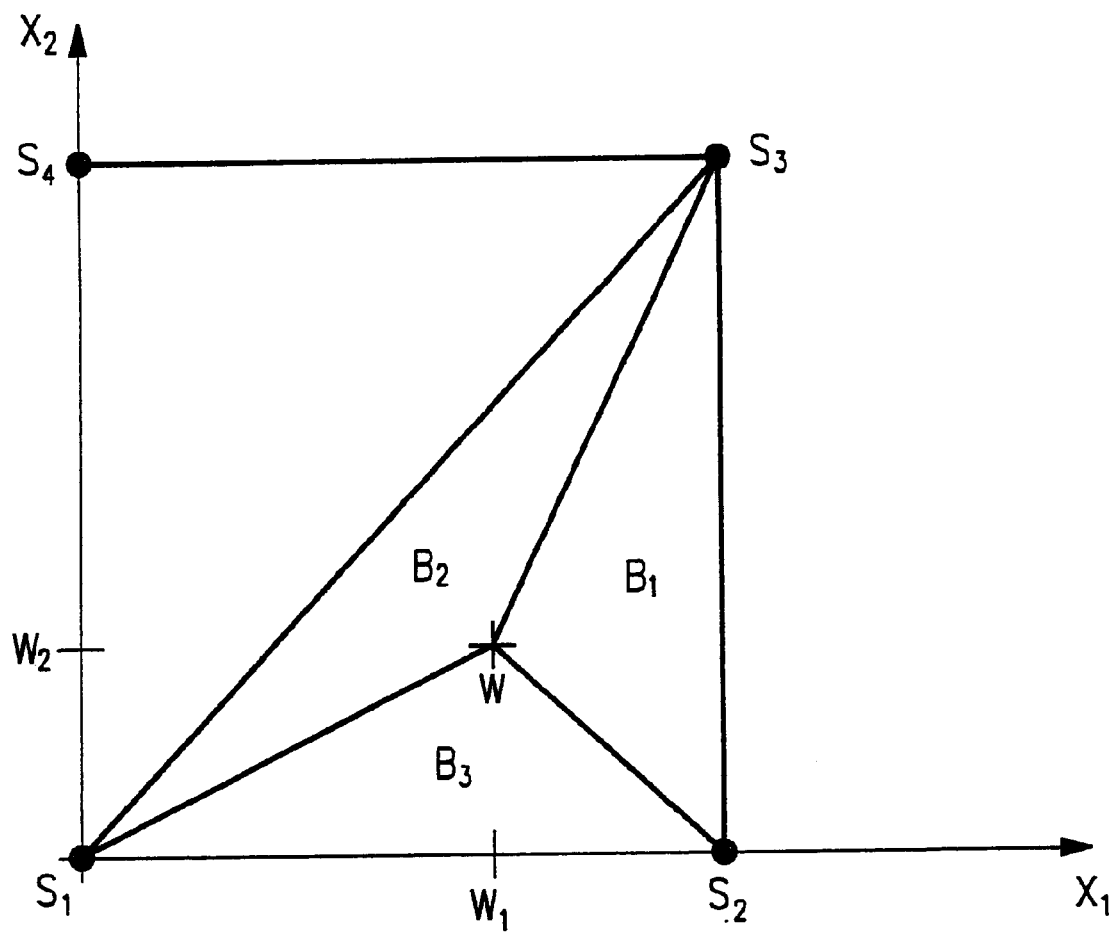
FIG. 2 shows a top view of a $X_1$, $X_2$ plane of a sector of the characteristics grid map shown in FIG. 1.

To describe the interpolation, which is performed in the framework of the method according to the present invention, reference is made to FIG. 2. The characteristics-map value $Y_W$ is determined for operating point W within the framework of a linear interpolation. Interpolating linearly uses a minimum number of data points $S_1$, $S_2$, $S_3$. The number of data points used results from the dimension of the characteristics grid map, i.e. from the number n=2 of performance quantities $X_1$ and $X_2$ of the process, which define the characteristics map, plus one (n+1=3). To enable a simple, uniform interpolation routine, a uniform triangulation direction between $S_1$ and $S_3$ is determined.

The interpolation between the data points $S_1$, $S_2$, $S_3$ is performed based on the interpolation equation:

$$Y_W = (B_1 * Y_1 + B_2 * Y_2 + B_3 * Y_3)/(B_1 + B_2 + B_3).$$

In this context, $B_1$, $B_2$, $B_3$ are the areas of triangular sections, within the interpolation triangle defined by the specific data points, $S_1$, $S_2$, $S_3$, which are defined by operating point W and any two of the data points, $S_2$, $S_3$; $S_1$, $S_3$; $S_1$, $S_2$.

The areas of the triangular sections are calculated using the following equations:

$$2*B_2 = W_1*S_{32} - W_2*S_{31},$$

$$2*B_3 = -W_1*S_{22} + W_2*S_{21},$$

$$2*B_1 = 1 - 2*(B_2 + B_3),$$

$S_{i1}$ and $S_{i2}$ being the coordinates of data points $S_i$ on the $X_1$-axis or $X_2$-axis of the coordinate system.

Different measures can be used to achieve a further reduction of the computational time for interpolation. Data points $S_i$, by which a characteristics grid map is represented, are typically arrayed equidistant to each other. However, there are characteristics grid maps where data points $S_i$ in those ranges of the characteristics map, in which the stored functional values vary greatly or in which a greater local accuracy is required, are closer together than in the remaining characteristics map.

In such characteristics grid maps that have non-equidistant data points $S_i$, the coordinates of the data points can be filed with a running number in a data-point table. Prior to interpolating between data points $S_1$, $S_2$, $S_3$, the running numbers of data points $S_1$, $S_2$, $S_3$ are determined from the data-point table. As a result, the distances between two adjacent data points of the characteristics grip map are normalized to the value 1. Thus, the interpolation triangle, in which operating point W lies, has an area of $B_1+B_2+B_3=\frac{1}{2}=0.5$. When the interpolation equation's numerator and denominator are multiplied by 2, the result is the value 1 in the denominator. The interpolation equation is thereby simplified to:

$$Y_W=2*(B_1*Y_1+B_2*Y_2+B_3*Y_3)$$

As a result of the characteristic map access via the data-point tables, data points $S_1$, $S_2$, $S_3$ for the interpolation calculation with the two-dimensional characteristics grid map in question lie at (0,0), (1,0) and (1,1). As a result, equidistant data-point distribution can then be expected within the characteristics map, thereby decidedly reducing the computational time for calculating the areas of the triangular sections. Thus, the areas of the triangular sections are calculated as follows:

$$2*B_2=W_1*S_{32}-W_2*S_{31}=W_1-W_2,$$

$$2*B_3=-W_1*S_{22}+W_2*S_{21}=W_2,$$

$$2*B_1=1-2*(B_2+B_3)=1-2*W_1,$$

$W_1$, $W_2$ are the coordinates of operating point W on the $X_1$-axis or $X_2$-axis. Furthermore, $S_{i1}$ and $S_{i2}$ are the coordinates of data points $S_i$ on the $X_1$-axis or $X_2$-axis of the coordinate system. The interpolation equation for a two-dimensional characteristics grid map is thereby simplified to:

$$Y_W=Y_1+W_1*(Y_2-Y_1)+W_2*(Y_3-Y_2).$$

To reduce the average computational time for determining the interpolation triangle in which operating point W lies, the intermediate values $Y_1$, $Y_2-Y_1$, and $Y_3-Y_2$ of the interpolation equation are stored at the end of a control cycle. At the beginning of the subsequent control cycle, a check test is made to determine if the operating point $W_{new}$ of the subsequent control cycle is still in the same interpolation range $X_{i1}-X_{i1-1}$; $X_{i2}-X_{i2-1}$. If this is the case, the stored intermediate values can be used for calculating the interpolation range of the subsequent control cycle. Thus, the computational time is reduced in the two-dimensional characteristics grid map to two multiplication functions and two addition functions.

To reduce the average computational time for interpolating in the calculated interpolation triangle, operating point W and the determined characteristics-map value $Y_W$ are stored at the conclusion of a control cycle, and at the start of the subsequent control cycle, operating point $W_{new}$ is examined to determine if it has remained the same. A simple query at the start of the subsequent control cycle can then replace the relatively complicated interpolation process for determining the characteristics-map value $Y_{Wnew}$.

In these embodiments of the present invention for reducing the computational time in determining the interpolation triangle and in interpolating in the interpolation triangle, the fact that operating point W typically travels through the characteristics map continuously and with a limited rate of change is taken into account.

What is claimed is:

1. A method for controlling a process in a motor vehicle using a characteristics grid map, comprising:

defining the characteristics grid map by a plurality of performance quantities of the process;

representing the characteristics grid map by data points having corresponding characteristics-map values; and in a control cycle for an operating point of the process, determining at least one of the characteristics-map values as a function of the characteristics grid map by the steps of:

first determining adjacent data points defining an interpolation range in which the operating point lies, and then interpolating between the adjacent data points, the at least one of the characteristics-map values being determined for the operating point as a function of a minimum number of data points using a linear interpolation, the minimum number of data points being calculated from the number of the plurality of performance quantities of the process.

2. The method according to claim 1, wherein:

the process is one of a combustion process, a gear-shifting process, and a braking process.

3. The method according to claim 1, wherein:

the minimum number of data points is a function of the number of performance quantities of the process plus one.

4. The method according to claim 1, wherein:

the characteristics grid map is defined by two performance quantities of the process; and in the control cycle for the operating point of the process, the at least one of the characteristics-map values is determined as a function of the characteristics map by the steps of:

first determining three adjacent data points defining an interpolation triangle in which the operating point lies, and then interpolating between the three adjacent data points using an interpolation equation:

$$Y_W=(B_1*Y_1+B_2*Y_2+B_3*Y_3)/(B_1+B_2+B_3),$$

wherein $B_1$, $B_2$, and $B_3$ are areas of triangular sections within the interpolation triangle defined by the three adjacent data points, each of the areas of the triangular sections being defined by the operating point and any two data points of the three adjacent data points.

5. The method according to claim 4, wherein:

the step of determining the three adjacent data points includes the steps of:

first searching a data-point table to establish a characteristics-map grid square in which the operating point lies, and then comparing performance-quantity components of the operating point to determine within the characteristics-map grid square the interpolation triangle.

6. The method according to claim 4, further comprising:

storing intermediate values of the interpolation equation at a conclusion of a control cycle; and at a start of a subsequent control cycle, performing a check test to determine if an operating point of the subsequent control cycle still lies within the interpolation range.

7. The method according to claim 1, wherein:

the characteristics grid map is defined by three performance quantities of the process;

in the control cycle for the operating point of the process, the at least one characteristics-map value is determined as a function of the characteristics grid map by the steps of:

first determining four adjacent data points defining an interpolation tetrahedron in which the operating point lies, and then interpolating between the four adjacent data points using the interpolation equation:

$$Y_W = (B_1 * Y_1 + B_2 * Y_2 + B_3 * Y_3 + B_4 * Y_4)/(B_1 + B_2 + B_3 + B_4),$$

wherein $B_1$, $B_2$, $B_3$, and $B_4$ are volumes of partial tetrahedrons of the interpolation tetrahedron defined by the four adjacent data points, each of the volumes of the partial tetrahedrons being defined by the operating point and any three data points of the four adjacent data points.

8. The method according to claim 1, further comprising:

prior to the step of interpolating, normalizing distances between two adjacent data points of the characteristics grid map to the value 1.

9. The method according to claim 1, further comprising:

storing the operating point and the at least one of the characteristics-map values at a conclusion of a control cycle; and at a start of a subsequent control cycle, performing a check test to determine whether an operating point of the subsequent control cycle has remained the same.

10. A control device for controlling a process in a motor vehicle using a characteristics grid map, the device including an arrangement for performing the steps of:

defining the characteristics grid map by a plurality of performance quantities of the process;

representing the characteristics grid map by data points having corresponding characteristics-map values; and in a control cycle for an operating point of the process, determining at least one of the characteristics-map values as a function of the characteristics grid map by the steps of:

first determining adjacent data points defining an interpolation range in which the operating point lies, and then interpolating between the adjacent data points, the at least one of the characteristics-map values being determined for the operating point as a function of a minimum number of data points using a linear interpolation, the minimum number of data points being calculated from the number of the plurality of performance quantities of the process.

11. The device according to claim 10, wherein:

the process is one of a combustion process, a gear-shifting process, and a braking process.

* * * * *